United States Patent
Walker

(10) Patent No.: US 10,895,959 B2
(45) Date of Patent: Jan. 19, 2021

(54) SYSTEMS AND METHODS FOR FAN INTERACTION, TEAM/PLAYER LOYALTY, AND SPONSOR PARTICIPATION

(71) Applicant: EkRally, LLC, Austin, TX (US)

(72) Inventor: Mark Walker, Austin, TX (US)

(73) Assignee: EkRally LLC, Austin, TX (US)

( * ) Notice: Subject to any disclaimer, the term of this patent is extended or adjusted under 35 U.S.C. 154(b) by 37 days.

(21) Appl. No.: 15/878,298

(22) Filed: Jan. 23, 2018

(65) Prior Publication Data

US 2018/0210617 A1 Jul. 26, 2018

Related U.S. Application Data

(60) Provisional application No. 62/449,327, filed on Jan. 23, 2017.

(51) Int. Cl.
| | |
|---|---|
| *G06F 3/0482* | (2013.01) |
| *G06F 3/01* | (2006.01) |
| *G01S 5/00* | (2006.01) |
| *G06F 3/0488* | (2013.01) |
| *G06F 1/16* | (2006.01) |

(Continued)

(52) U.S. Cl.
CPC .......... *G06F 3/0482* (2013.01); *G01S 5/0027* (2013.01); *G06F 1/1694* (2013.01); *G06F 3/017* (2013.01); *G06F 3/04883* (2013.01); *G01S 19/42* (2013.01); *G01S 19/49* (2013.01); *G06F 3/0488* (2013.01); *G06F 2200/1637* (2013.01); *G06Q 30/0239* (2013.01); *H04N 21/41407* (2013.01); *H04N 21/4781* (2013.01); *H04N 21/4788* (2013.01)

(58) Field of Classification Search
CPC ................. G06F 3/0482; G06F 3/0488; G06F 2200/1637; G06F 3/017; G06F 1/1694; G01S 5/0027; G01S 19/42
See application file for complete search history.

(56) References Cited

U.S. PATENT DOCUMENTS

| | | | |
|---|---|---|---|
| 8,648,799 B1 | 2/2014 | Lloyd | |
| 9,855,484 B1 * | 1/2018 | Matak | ................... A63B 71/06 |

(Continued)

OTHER PUBLICATIONS

International Search Report dated Apr. 4, 2018 from US PCT Application No. PCT/US2018/014910.

*Primary Examiner* — Dino Kujundzic
(74) *Attorney, Agent, or Firm* — Rutan & Tucker LLP; Hani Z. Sayed

(57) ABSTRACT

A system for fan interaction is disclosed including, in some embodiments, a fan-interaction module stored in a memory of a mobile device; a touchscreen display interface; and one or more sensors selected from a touchscreen sensor, an accelerometer, a gyroscope, and a global positioning system receiver. The fan-interaction module can be configured to: 1) provide a notification to a fan that an entity the fan supports is to perform or an event the fan supports is to occur; 2) log an interaction of the fan with the device regarding the entity ready to perform or the event ready to occur; 3) calculate an amount of kinetic energy associated with the interaction; and 4) provide the amount of kinetic energy to a server for combination with a combined amount of calculated kinetic energy for up to all fans of the entity ready to perform or the event ready to occur.

4 Claims, 4 Drawing Sheets

Figure 1:
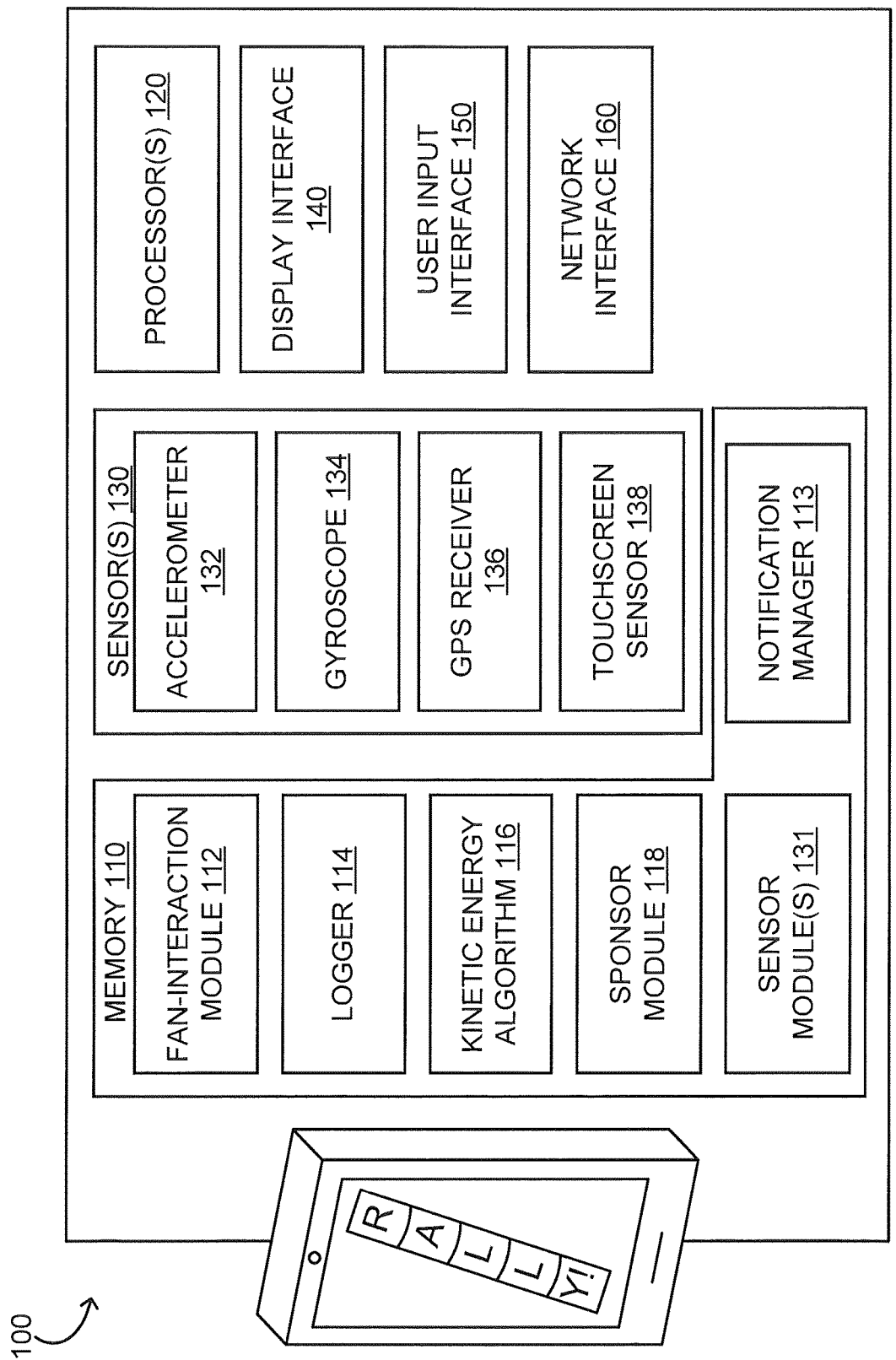

(51) Int. Cl.
    *G06Q 30/02*      (2012.01)
    *G01S 19/42*      (2010.01)
    *H04N 21/4788*    (2011.01)
    *H04N 21/478*     (2011.01)
    *H04N 21/414*     (2011.01)
    *G01S 19/49*      (2010.01)

(56) References Cited

U.S. PATENT DOCUMENTS

| | | | |
|---|---|---|---|
| 2005/0239551 A1* | 10/2005 | Griswold | A63F 13/12 |
| | | | 463/42 |
| 2007/0018952 A1* | 1/2007 | Arseneau | G06F 1/1626 |
| | | | 345/156 |
| 2007/0259716 A1* | 11/2007 | Mattice | G06F 3/013 |
| | | | 463/36 |
| 2007/0282948 A1* | 12/2007 | Praino | G06Q 10/10 |
| | | | 709/204 |
| 2012/0029987 A1 | 2/2012 | Kusumoto et al. | |
| 2012/0239526 A1* | 9/2012 | Revare | G06Q 30/06 |
| | | | 705/26.8 |
| 2013/0041590 A1* | 2/2013 | Burich | G06F 19/3418 |
| | | | 702/19 |
| 2013/0080348 A1* | 3/2013 | Pantaliano | G06Q 30/02 |
| | | | 705/347 |
| 2013/0311566 A1 | 11/2013 | Milburn et al. | |
| 2014/0156752 A1 | 6/2014 | Fetyko | |
| 2016/0274735 A1* | 9/2016 | Kauffmann | G06F 3/0481 |
| 2016/0352726 A1 | 12/2016 | Hyde et al. | |
| 2016/0353252 A1* | 12/2016 | Krasadakis | H04N 21/4756 |
| 2018/0345149 A1* | 12/2018 | Farudi | H04L 9/0637 |

\* cited by examiner

SYSTEMS AND METHODS FOR FAN INTERACTION, TEAM/PLAYER LOYALTY, AND SPONSOR PARTICIPATION

CROSS REFERENCE

This application claims the benefit under 35 USC 119 of U.S. Provisional Patent Application No. 62/449,327, filed Jan. 23, 2017, titled "Systems and methods for fan interaction, team/player loyalty, and sponsor participation," which is hereby incorporated herein by reference in its entirety.

BACKGROUND

The effect of fan participation on the performance of sports stars, entertainers, and the like can be great. Provided herein are systems and methods that address the foregoing.

SUMMARY

Provided herein, in some embodiments, is a system for fan interaction including a fan-interaction module stored in a non-volatile memory of a mobile device; a touchscreen display interface; and one or more sensor modules configured to process sensor data respectively from one or more sensors selected from a touchscreen sensor, an accelerometer, a gyroscope, and a global positioning system ("GPS") receiver. The fan-interaction module upon loading into a volatile memory of the mobile device and being executed by one or more processors of the mobile device can be configured to provide a notification through the touchscreen display interface to a fan that an entity the fan supports is ready to perform or an event the fan supports is ready to occur. The fan-interaction module can be further configured to log an interaction of the fan with a logger of the mobile device regarding the entity ready to perform or the event ready to occur. Alternatively, the fan-interaction module can be further configured to log an instance of the interaction of the fan with the logger of the mobile device. The fan-interaction module can be further configured to calculate an amount of kinetic energy associated with the interaction using a kinetic energy algorithm of the mobile device. The fan-interaction module can be further configured to provide the amount of kinetic energy over a network interface to one or more servers for combination with a combined amount of calculated kinetic energy for up to all fans of the entity ready to perform or the event ready to occur. Alternatively, the fan-interaction module can be further configured to provide the instance of the interaction of the fan over the network interface to the one or more servers for combination with a combined number of instances for up to all fans of the entity ready to perform or the event ready to occur.

In some embodiments, the interaction of the fan with the mobile device includes moving the mobile device into a position and holding the mobile device in the position.

In some embodiments, the interaction of the fan with the mobile device includes waving the mobile device, swinging the mobile device, or tapping a touchscreen display of the mobile device. Each of the foregoing actions produces the sensor data for subsequent processing by the appropriate sensor module of the one or more sensor modules.

In some embodiments, the fan-interaction module is further configured to provide an interactive visual element on a touchscreen display of the mobile device. The interactive visual element includes a rally item selected from a rally stick, a rally towel, a rally, and a clapper.rally icon/button.

In some embodiments, the interaction of the fan with the mobile device includes waving the mobile device when the interactive visual element is the rally stick. The fan-interaction module is further configured to log the interaction of the fan with the logger of the mobile device by logging the sensor data generated by the accelerometer, the gyroscope, or a combination thereof during the waving.

In some embodiments, the interaction of the fan with the mobile device includes swinging the mobile device when the interactive visual element is a rally towel. The fan-interaction module is further configured to log the interaction of the fan with the logger of the mobile device by logging the sensor data generated by the accelerometer, the gyroscope, or a combination thereof during the swinging.

In some embodiments, the interaction of the fan with the mobile device includes tapping the touchscreen display of the mobile device when the interactive visual element is the rally clapper and rally icon/button. The fan-interaction module is further configured to log the interaction of the fan with the logger of the mobile device by logging the sensor data generated by the touchscreen display during the tapping.

In some embodiments, the system further includes a sponsor module stored in the non-volatile memory of the mobile device. Upon loading the sponsor module into the volatile memory of the mobile device and executing the sponsor module by one or more processors of the mobile device, the sponsor module is configured to enable a sponsor to brand the rally item with one or more brands of the sponsor, sponsor the entity ready to perform or the event ready to occur, and hold contests among up to all the fans of the entity ready to perform or the event ready to occur.

In some embodiments, the system further includes a GPS module of the one or more sensor modules. Upon loading the GPS module into the volatile memory of the mobile device and executing the GPS module by one or more processors of the mobile device, the GPS module is configured to calculate a geographical location of the mobile device from data received by the GPS receiver. In addition, the fan-interaction module is further configured to provide the geographical location of the mobile device to the one or more servers for geolocating up to all the fans of the entity ready to perform or the event ready to occur.

In some embodiments, the system further includes a network interface. The fan-interaction module is further configured to cooperate with the network interface for direct communication of one or more of the fans with the entity ready to perform.

Also provided herein, in some embodiments, is a non-transitory machine-readable storage medium having stored thereon a computer program comprising a set of instructions that, upon execution by one or more processors of a mobile device, cause the mobile device to perform one or more steps including providing a notification to a fan, logging an interaction with the fan, calculating an amount of kinetic energy, and providing the amount of kinetic energy to one or more servers. Providing the notification to the fan can include providing a notification to the fan through a touchscreen display interface of the mobile device that an entity the fan supports is ready to perform or an event the fan supports is ready to occur. Logging the interaction of the fan can include logging an interaction of the fan with a logger of the mobile device regarding the entity ready to perform or the event ready to occur. Calculating the amount of kinetic energy can include calculating an amount of kinetic energy associated with the interaction using a kinetic energy algorithm of the mobile device. Providing the amount of kinetic energy to the one or more servers can include providing the amount of kinetic energy over a network interface to the one or more servers for combination with a combined amount of calculated kinetic energy for up to all fans of the entity ready to perform or the event ready to occur. A fan-interaction module can be configured for providing the amount of kinetic energy to the one or more servers.

In some embodiments, the interaction of the fan with the mobile device includes waving the mobile device, swinging the mobile device, or tapping a touchscreen display of the mobile device. Each of the foregoing actions produces sensor data for subsequent processing by one or more sensor modules of the mobile device.

In some embodiments, the one or more steps further includes providing an interactive visual element on a touchscreen display of the mobile device with a fan-interaction module of the mobile device. The interactive visual element includes a rally item selected from a rally stick, a rally towel, a rally clapper and a rally icon/button.

In some embodiments, the one or more steps further includes logging the interaction of the fan with the logger of the mobile device by logging sensor data generated by an accelerometer of the mobile device, a gyroscope of the mobile device, or a combination thereof when the fan waves the mobile device and the interactive visual element is the rally stick.

In some embodiments, the one or more steps further includes logging the interaction of the fan with the mobile device by logging sensor data generated by an accelerometer of the mobile device, a gyroscope of the mobile device, or a combination thereof when the fan swings the mobile device and the interactive visual element is the rally towel.

In some embodiments, the one or more steps further includes logging the interaction of the fan with the mobile device by logging sensor data generated by a touchscreen sensor of the mobile device when the fan taps the touchscreen display of the mobile device and the interactive visual element is the rally clapper.

In some embodiments, the one or more steps further includes enabling a sponsor with a sponsor module of the mobile device to brand the rally item with one or more brands of the sponsor, sponsor the entity ready to perform or the event ready to occur, and hold contests among up to all the fans of the entity ready to perform or the event ready to occur.

In some embodiments, the one or more steps further include calculating a geographical location of the mobile device from sensor data received by a GPS receiver of the mobile device with a GPS module of the mobile device. In addition, the one or more steps further include providing the geographical location of the mobile, device with a fan-interaction module of the mobile device to the one or more servers for geolocating up to all the fans of the entity ready to perform or the event ready to occur.

In some embodiments, the one or more steps further includes enabling one or more of the fans to directly communicate with the entity ready to perform with the fan-interaction module of the mobile device when configured to cooperate with a network interface of the mobile device.

These and other features of the concepts provided herein may be better understood with reference to the following drawings, description, and appended claims.

DRAWINGS

FIG. 1 provides a schematic illustrating a mobile device in accordance with some embodiments.

Figure 2:
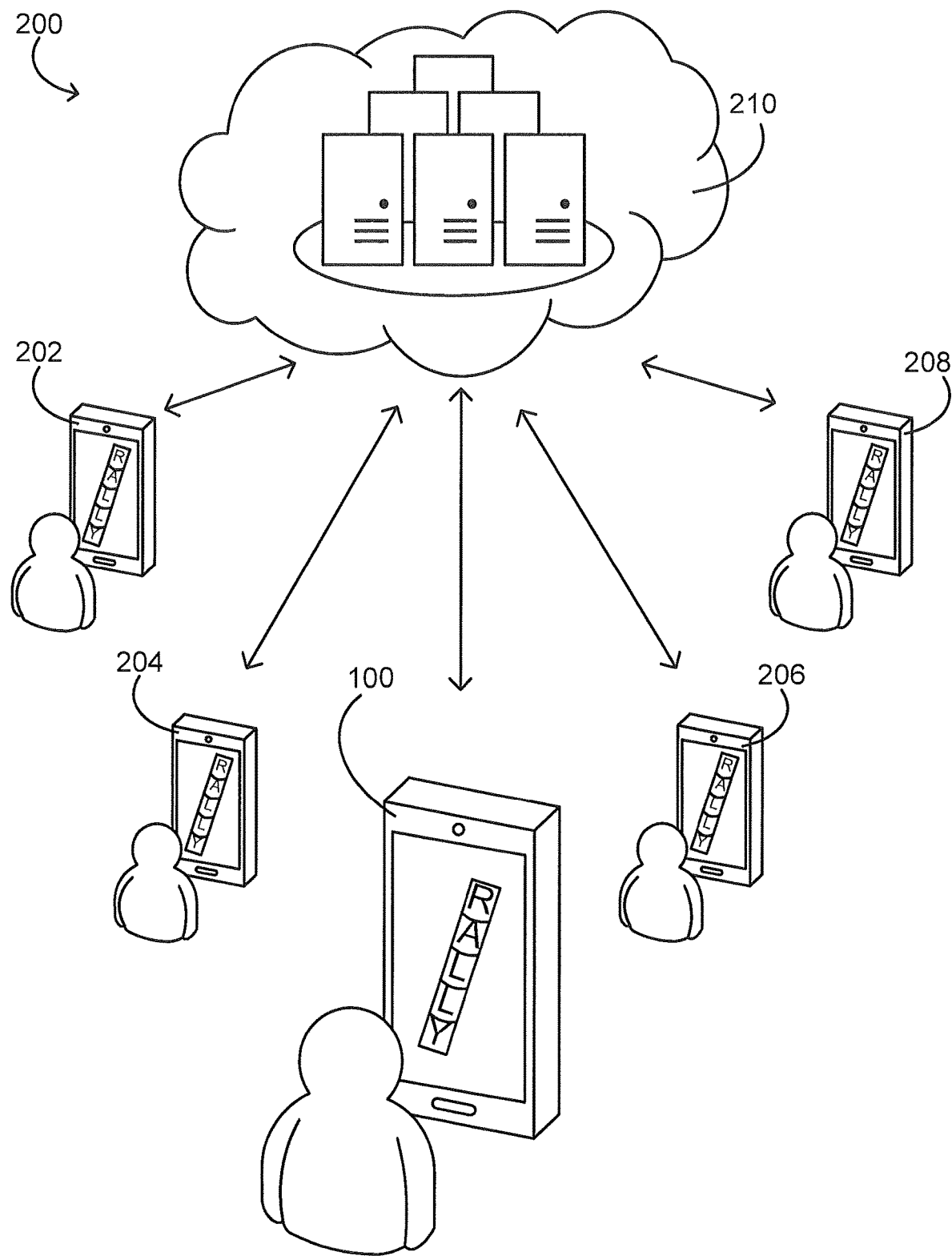

FIG. 2 provides a schematic illustrating a number of mobile devices in communication with one or more servers in accordance with some embodiments.

Figure 3:
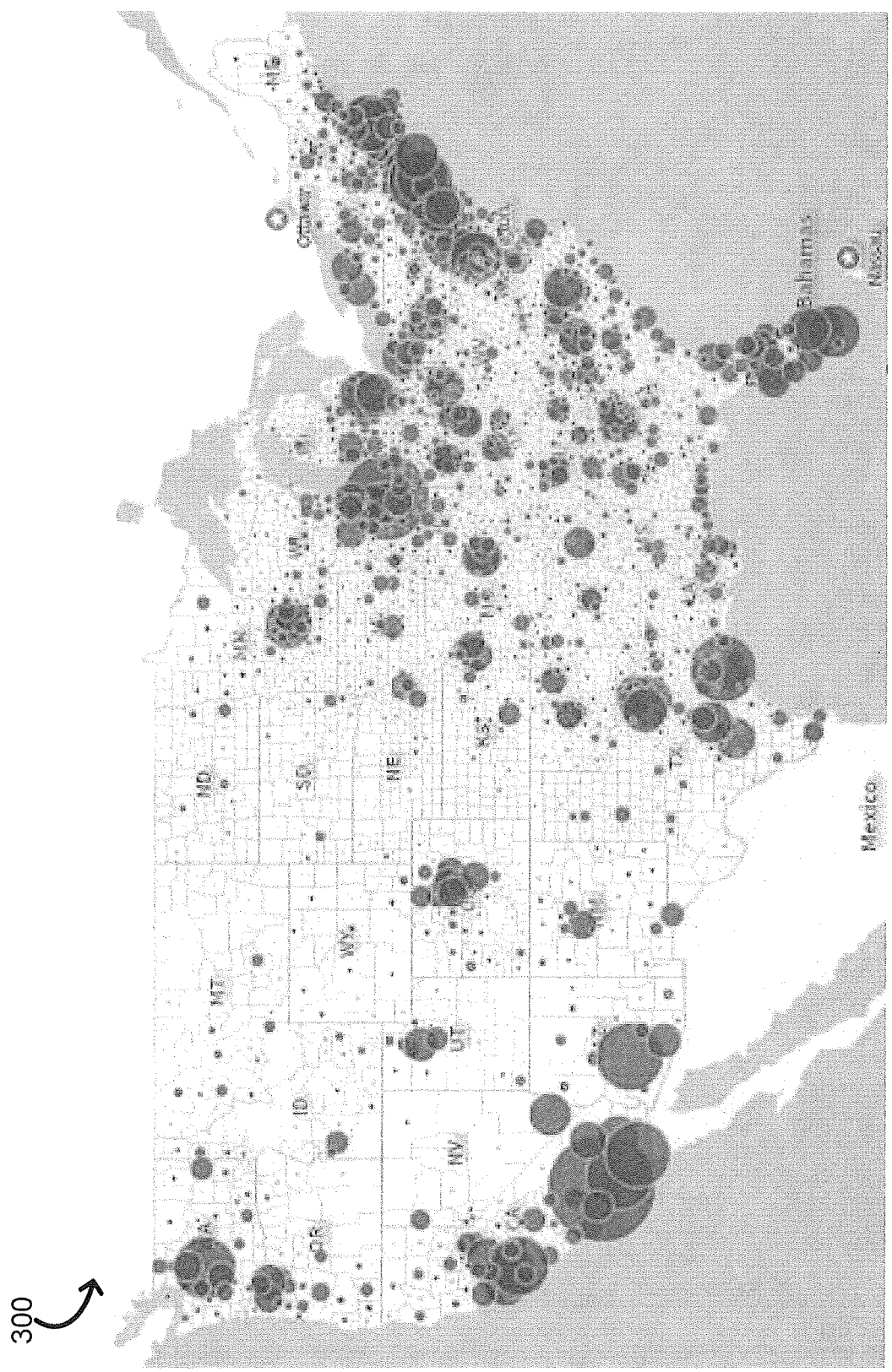

FIG. 3 provides a map illustrating geolocation of a number of mobile devices in accordance with some embodiments.

Figure 4:
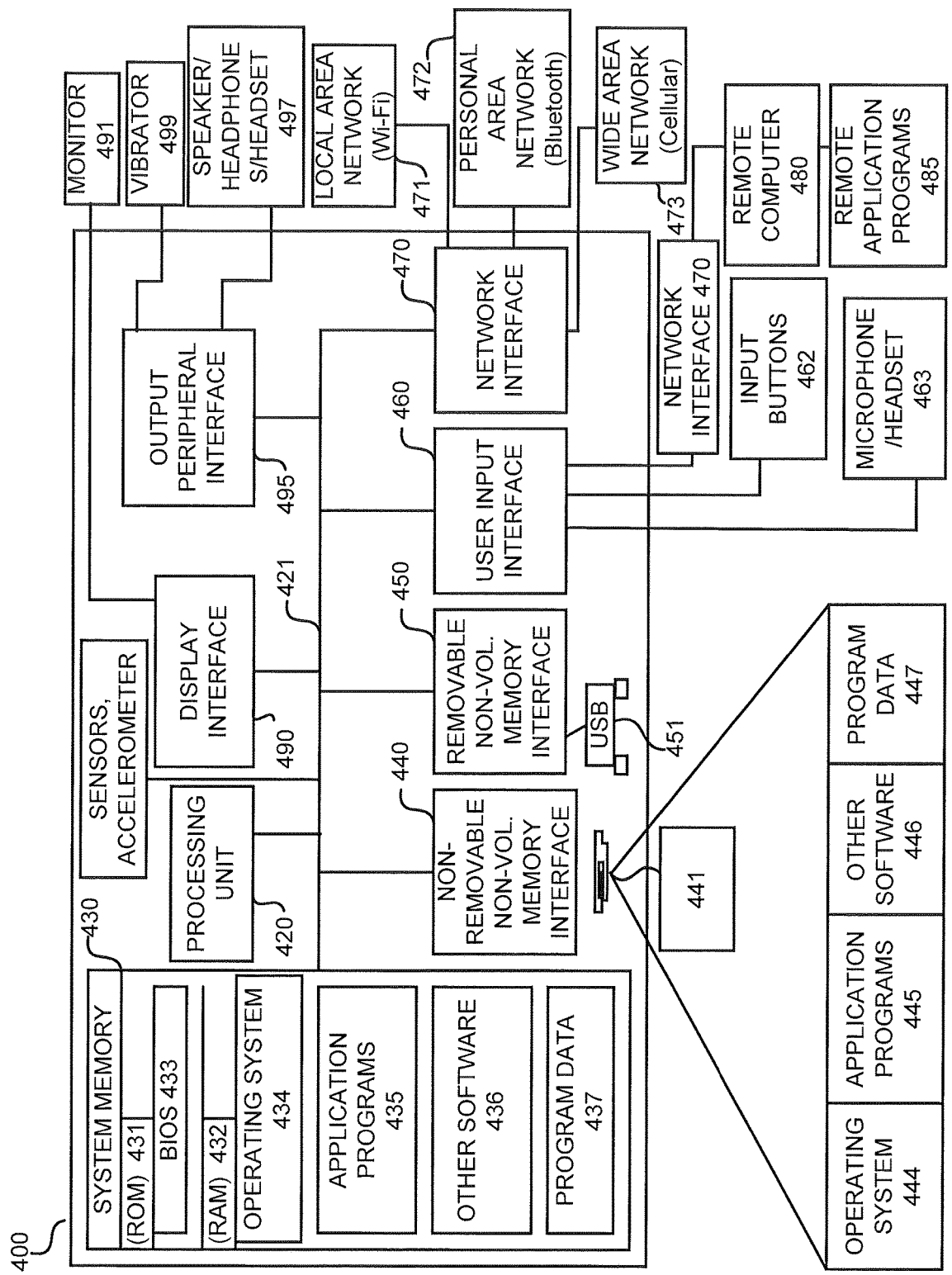

FIG. 4 provides a schematic illustrating a device in accordance with some embodiments.

DESCRIPTION

Before certain concepts and some embodiments thereof are provided in greater detail, it should be understood by persons of ordinary skill in the art that the concepts and embodiments provided herein are not limiting. For example, it should be understood that one or more elements in any embodiment provided herein can vary. In view of the foregoing, one or more elements from one or more embodiments can be combined with elements of any other embodiments, substituted for elements of any other embodiments, or some combination thereof.

It should also be understood that the terminology used herein is for the purpose of describing the concepts and embodiments provided herein, and the terminology is not intended to be limiting. Unless indicated otherwise, ordinal numbers (e.g., first, second, third, etc.) are used to distinguish or identify different elements or steps respectively in a group of elements or group of steps. The ordinal numbers do not supply a serial or numerical limitation. For example, "first," "second," and "third" elements or steps need not necessarily appear in that order, and the embodiments need not necessarily be limited to the three elements or steps. Unless indicated otherwise, labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art.

The effect of fan participation on the performance of sports stars, entertainers, and the like can be great. Provided herein are systems and methods that address the foregoing for greater fan interaction, team/player loyalty, and sponsor participation.

For example, provided herein is a system for fan interaction including, in some embodiments, a fan-interaction module stored in a non-volatile memory of a mobile device; a touchscreen display interface; and one or more sensor modules configured to process sensor data respectively from one or more sensors selected from a touchscreen sensor, an accelerometer, a gyroscope, and a GPS receiver. The fan-interaction module upon loading into a volatile memory of the mobile device and being executed by one or more processors of the mobile device can be configured to provide a notification through the touchscreen display interface to a fan that an entity the fan supports is ready to perform or an event the fan supports is ready to occur. The fan-interaction module can be further configured to log an interaction of the fan with a logger of the mobile device regarding the entity ready to perform or the event ready to occur. Alternatively, the fan-interaction module can be further configured to log an instance of the interaction of the fan with the logger of the mobile device. The fan-interaction module can be further configured to calculate an amount of kinetic energy associated with the interaction using a kinetic energy algorithm of the mobile device. The fan-interaction module can be further configured to provide the amount of kinetic energy over a network interface to one or more servers for combination with a combined amount of calculated kinetic energy for up to all fans of the entity ready to perform or the event ready to occur. Alternatively, the fan-interaction module can be further configured to provide the instance of the interaction of the fan over the network interface to the one or more servers for combination with a combined number of instances for up to all fans of the entity ready to perform or the event ready to occur.

For another example, in some embodiments, the fan-interaction module of the foregoing mobile device can be further configured or alternatively configured to log an instance of the interaction of the fan with the mobile device regarding the entity ready to perform or the event ready to occur. The fan-interaction module can be further configured to provide the instance of the interaction of the fan to one or more servers for combination with a combined number of instances for up to all fans of the entity ready to perform or the event ready to occur. In such embodiments, the interaction of the fan with the mobile device includes moving the mobile device into a position and holding the mobile device in the position.

FIG. 1 provides a schematic illustrating a mobile device 100, of which, one or more elements form at least a portion of the system in accordance with some embodiments.

As shown in FIG. 1, the mobile device 100 can include a memory 110 (e.g., random-access memory), one or more processors 120, one or more sensors 130, a display interface 140, a user-input interface 150, and a network interface 160. The sensors can include, but are not limited to, a sensor selected from an accelerometer 132, a gyroscope 134, a GPS receiver 136, and a touchscreen sensor 138. The memory can include stored therein one or more modules selected from a fan-interaction module 112, a logger 114, a kinetic energy algorithm 116, a sponsor module 118, and one or more sensor modules 131 corresponding to the one or more sensors. In some embodiments, the mobile device 100 is a smart phone. FIG. 4 provided herein below and the description therefor provides additional optional elements of the mobile device 100 and description for how the elements of mobile device 100 such as the foregoing element cooperate with each other.

FIG. 2 provides a schematic illustrating a system including a number of mobile devices (e.g., a mobile device 202, a mobile device 204, a mobile device 206, and a mobile device 208) in communication with one or more servers 210 in accordance with some embodiments. One or more elements of each of the mobile devices and the one or more servers form the system in accordance with some embodiments.

As shown in FIG. 2, the number of mobile devices can be similar to the mobile device 100. For example, the number of mobile devices can be smart phones; however, the mobile devices are not limited to smart phones, as any mobile device including at least the elements of the mobile device 100 are included such as tablets.

Regarding interaction of the fan with the mobile device, the interaction of the fan with the mobile device can include, but is not limited to, waving the mobile device, swinging the mobile device, tapping the touchscreen display of the mobile device, or some combination thereof. An interactive visual element (e.g., rally element) can be provided on the touchscreen display during the interaction of the fan, the interactive element selected from a rally stick (see FIGS. 1 and 2), a rally towel, and a rally clapper.

The interaction of the fan with the mobile device can include waving the mobile device when the interactive visual element is the rally stick. Each of FIGS. 1 and 2 shows an example of a mobile phone with a rally stick on the touchscreen. In cooperation with the logger, the fan-interaction module can be further configured to log the interaction of the fan with the mobile device by logging data generated by the accelerometer, the gyroscope, or a combination thereof and provided through the corresponding sensor module during the waving.

The interaction of the fan with the mobile device can include swinging the mobile device when the interactive visual element is a rally towel. In cooperation with the logger, the fan-interaction module can be further configured to log the interaction of the fan with the mobile device by logging data generated by the accelerometer, the gyroscope, or a combination thereof and provided through the corresponding sensor module during the swinging.

The interaction of the fan with the mobile device can include tapping the touchscreen display of the mobile device when the interactive visual element is the rally clapper. In cooperation with the logger, the fan-interaction module can be further configured to log the interaction of the fan with the mobile device by logging data generated by the touchscreen display and provided through the corresponding sensor module during the tapping.

Regarding the sponsor module, the sponsor module can be configured to enable a sponsor to brand the rally item with one or more brands of the sponsor; sponsor the entity ready to perform or the event ready to occur; and hold contests among up to all the fans of the entity ready to perform or the event ready to occur.

Regarding the GPS module, the GPS module can be configured to calculate a geographical location of the mobile device from data received by the GPS receiver. In cooperation with the network interface, the fan-interaction module can be further configured to provide the geographical location of the mobile device to the one or more servers for geolocating up to all the fans of the entity ready to perform or the event ready to occur. FIG. 3 provides a bubble map 300 illustrating geolocation of a number of mobile devices and, by bubble size, a relative number of fans at each geolocation in accordance with some embodiments.

Regarding the network interface, the fan-interaction module can be further configured to cooperate with the network interface for direct communication of one or more of the fans with the entity ready to perform.

Fans can download an app in accordance with their smart phone platform from a corresponding digital distribution service for free. Upon execution of the app to instantiate the fan-interaction module, fans can rally for their favorite team or player when, for example, the team is coming onto the field, the player is coming to the plate or mound, or when a game is close and the hour late. Again, the rally items can include a rally stick, a rally towel, or a rally clapper, each of which can be ordained with a logo of a sponsor by way of the sponsor module. The app is configured to provide additional rally items and ring tones by way of in-app purchases, as well as mascots, player bobble heads, upgraded rally sticks, rally towels, and rally clappers for an additional "RallyBoost." Fans can rally by waiving their phones back and forth or tapping their phones in accordance with the rally element.

A sponsor can appear as the title sponsor on the rally towel, rally stick, or rally clapper, and have the option to sponsor one game, a block of games, or an entire season of games. The app is also configured to provide contests with sponsors through the app. If a player hits a homerun, every contestant who rallied for the player can get free merchandise or food such as a taco through a coupon (e.g., a 10% discount coupon) issued through the app.

The app can operate under a live, in-game data feed (e.g., ticker, stream of select notifications by way of the display interface or output peripheral interface 495 of FIG. 4, etc.) indicating to fans when a batter is coming to the plate, a pitcher coming to the mound, the batter hits a homerun, or the pitcher strikes out a batter to close a game out. Upon downloading and running the app, fans can select their favorite players to be notified about such as by opting in to notifications on their smart phones, which notifications are provided through a notification manager 113 in the app. (See FIG. t) With each pending selected event, whether each of the fans is sitting at his/her desk at work, at dinner with friends, or taking a nap, the fan can receive a notification: "It's Time to Rally!" In addition, fans can elect to be geolocated so that they can be "counted" on the main geolocation map (see FIG. 3) shown at the stadium, in the app, online, or the like.

The system has an experimental benefit in that the system can measure through the app the effect fan participation has on the performance of sports stars, entertainers, etc.

The app is configured to track the excitement and participation of a fan through first geolocating the fan anywhere on the globe as the fan cheers his or her team(s) or player(s) on, and, then, also measuring the kinetic energy created by the fan waving his or her smart phone in support. The data can be collected by the one or more servers, the amount of kinetic energy created can be consolidated with that of other fans, and the kinetic energy can be translated into laymen's terms and subsequently provided to the fans as "enough kinetic energy to hit a baseball 5 miles," "enough kinetic energy to throw a baseball at the speed of sound," etc.

The kinetic energy can be calculated by way of the kinetic energy algorithm using the following equation:

$$\text{Kinetic Energy (KE)} = \tfrac{1}{2} \text{mass} \times \text{velocity}^2 \text{ or } E_k = \tfrac{1}{2} m v^2$$

The app can be used in any and all athletic events, entertainment events, and public events (e.g., political speeches).

The app is configured with the various module described herein to calculate, track, and collect an amount of kinetic energy created with a smart phone by "rallying" with the phone, for example, in an up-and-down motion as if rallying with a rally stick.

The app can be configured with a "solidarity mode," which does not need to track the amount of kinetic energy. Rather, in solidarity mode, the app is configured to track fans that are simultaneously holding their smart phones in various positions such as above their heads, etc.

The app can be configured to enable fantasy-sports interaction with players and their performances.

The app can be configured to enable geolocating fans through their GPS receivers so there can be interaction for players, teams, other fans, and sponsors/advertisers.

The app can be configured to enable direct communication over the network interface between players, teams, and the like and their fans via video feed such as upon success of a rally, etc.

Collated results can be displayed on an in-stadium screen, website, or in the app itself.

The app can also be configured to provide the ability for players to incentivize personal support by giving awards weekly, monthly, or season-long for fans that support their players the most: "Trip to Spring Training for the top 3 ralliers!"

The app can also be configured to include a challenge system, which enables integration of the kinetic energy collected in the app with various video games, optionally further enabling competing against players live.

Rally events for fans can be tracked by the app and tallied throughout the season. Fans can see immediate feedback on how their support has affected the performance of their favorite players as shown in Table 1.

TABLE 1

| Effect of fans' support on performance for their favorite players. | | | | | |
| --- | --- | --- | --- | --- | --- |
| STATS | BA | HR | RBI | OBP | SLG |
| 2015 Season | .271 | 25 | 85 | .309 | .813 |
| w/ your help | .313 | 10 | 16 | .342 | .938 |
| w/out you | .257 | 15 | 69 | .299 | .772 |

The app encourages fan participation in games outside of stadiums and allows for the first time, real individual geolocation data and how the data affects the fan experience. In addition, the data can show how each individual fan patronizes sponsors.

Geolocation can give players live information on where their fans are located, how loyal their fans are, who their "SuperFans" are (for contests), and how much their fans directly support the sponsors through the app. Also, players can log in, set their rallying preferences such as creating a rally item and walk-up music for additional in-app revenue.

As fans open their app to rally for their favorite player or team, the fans can be geolocated and the kinetic energy created by waiving their smart phones can be stored and uploaded to a live geolocation map such as the bubble map of FIG. 3, in which the bubbles can represent the amounts of the kinetic energy. The data feed can be made available through an application programming interface ("API") for stadiums and their scoreboard screens, websites, and the like to show current live national participation in the game.

FIG. 4 provides a schematic illustrating a computer system 400 in accordance with some embodiments. The computer system 400 can be, wholly or partially, part of one or more of the mobile devices or one or more of the servers in accordance with some embodiments. The computer system 400 along with the remote computer system 480 can also represent a server of the system in communication with a mobile device of the system or vice-versa.

With reference to FIG. 4, components of the computer system 400 can include, but are not limited to, a processing unit 420 having one or more processing cores, a system memory 430, and a system bus 421 that couples various system components including the system memory 430 to the processing unit 420. The system bus 421 can be any of several types of bus structures selected from a memory bus or memory controller, a peripheral bus, and a local bus using any of a variety of bus architectures.

Computer system 400 typically includes a variety of computer machine-readable media. Computer machine-readable media can be any available media that can be accessed by computer system 400 and includes both volatile and nonvolatile media, and removable and non-removable media. By way of example, and not limitation, computer machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium which can be used to store the desired information and which can be accessed by the computer device 400. Transitory media such as wireless channels are not included in the machine-readable media. Communication media typically embody computer readable instructions, data structures, other executable software, or other transport mechanism and includes any information delivery media. As an example, some client computer systems on a network might not have optical or magnetic storage.

The system memory 430 includes computer storage media in the form of volatile and/or nonvolatile memory such as read only memory ("ROM") 431 and random-access memory ("RAM") 432. A basic input/output system 433 ("BIOS") containing the basic routines that help to transfer information between elements within the computer system 400, such as during start-up, is typically stored in ROM 431. RAM 432 typically contains data and/or software that are immediately accessible to and/or presently being operated on by the processing unit 420. By way of example, and not limitation, FIG. 4 illustrates that RAM 432 can include a portion of the operating system 434, application programs 435, other executable software 436, and program data 437.

The computer system 400 can also include other removable/non-removable volatile/nonvolatile computer storage media. By way of example only, FIG. 4 illustrates a solid-state memory 441. Other removable/non-removable, volatile/nonvolatile computer storage media that can be used in the example operating environment include, but are not limited to, USB drives and devices, flash memory cards, solid state RAM, solid state ROM, and the like. The solid-state memory 441 is typically connected to the system bus 421 through a non-removable memory interface such as interface 440, and USB drive 451 is typically connected to the system bus 421 by a removable memory interface, such as interface 450.

The drives and their associated computer storage media discussed above and illustrated in FIG. 4, provide storage of computer readable instructions, data structures, other executable software and other data for the computer system 400. In FIG. 4, for example, the solid-state memory 441 is illustrated for storing operating system 444, application programs 445, other executable software 446, and program data 447. Note that these components can either be the same as or different from operating system 434, application programs 435, other executable software 436, and program data 437. Operating system 444, application programs 445, other executable software 446, and program data 447 are given different numbers here to illustrate that, at a minimum, they are different copies.

A user can enter commands and information into the computer system 400 through input devices such as a keyboard, touchscreen, or software or hardware input buttons 462, a microphone 463, a pointing device and/or scrolling input component, such as a mouse, trackball or touch pad. The microphone 463 can cooperate with speech recognition software. These and other input devices are often connected to the processing unit 420 through a user input interface 460 that is coupled to the system bus 421, but can be connected by other interface and bus structures, such as a parallel port, game port, or a universal serial bus ("USB"). A display monitor 491 or other type of display screen device is also connected to the system bus 421 via an interface, such as a display interface 490. In addition to the monitor 491, computer devices can also include other peripheral output devices such as speakers 497, a vibrator 499, and other output devices, which can be connected through an output peripheral interface 495.

The computer system 400 can operate in a networked environment using logical connections to one or more remote computers/client devices, such as a remote computer system 480. The remote computer system 480 can be a personal computer, a mobile device, a server, a router, a network PC, a peer device or other common network node, and typically includes many or all of the elements described above relative to the computer system 400. The logical connections depicted in FIG. 4 can include a personal area network ("PAN") 472 (e.g., Bluetooth®), a local area network ("LAN") 471 (e.g., Wi-Fi), and a wide area network ("WAN") 473 (e.g., cellular network), but can also include other networks such as a personal area network (e.g., Bluetooth®). Such networking environments are commonplace in offices, enterprise-wide computer networks, intranets and the Internet. A browser application can be resident on the computer device and stored in the memory.

When used in a LAN networking environment, the computer system 400 is connected to the LAN 471 through a network interface or adapter 470, which can be, for example, a Bluetooth® or Wi-Fi adapter. When used in a WAN networking environment (e.g., Internet), the computer system 400 typically includes some means for establishing communications over the WAN 473. With respect to mobile telecommunication technologies, for example, a radio interface, which can be internal or external, can be connected to the system bus 421 via the network interface 470, or other appropriate mechanism. In a networked environment, other software depicted relative to the computer system 400, or portions thereof, can be stored in the remote memory storage device. By way of example, and not limitation, FIG. 4 illustrates remote application programs 485 as residing on remote computer device 480. It will be appreciated that the network connections shown are examples and other means of establishing a communications link between the computer devices can be used.

As discussed, the computer system 400 can include a processor 420, a memory (e.g., ROM 431, RAM 432, etc.), a built-in battery to power the computer device, an AC power input to charge the battery, a display screen, a built-in Wi-Fi circuitry to wirelessly communicate with a remote computer device connected to network.

It should be noted that the present design can be carried out on a computer system such as that described with respect to FIG. 4. However, the present design can be carried out on a server, a computer device devoted to message handling, or on a distributed system in which different portions of the present design are carried out on different parts of the distributed computer system.

Another device that can be coupled to bus 421 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include ROM; RAM; magnetic disk storage media; optical storage media; flash memory devices; DVDs, EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computer device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

The foregoing represents an advance in technology for greater fan interaction with fans' teams and players, loyalty of the fans for their teams and players, and sponsor participation in such interactions, which advance in technology would not be possible outside the computer-related technology in which it is rooted.

While the foregoing concepts and embodiments thereof have been provided in considerable detail, it is not the intention of the applicant(s) for the concepts and embodiments provided herein to be limiting. Additional adaptations and/or modifications are possible, and, in broader aspects, these adaptations and/or modifications are also encompassed. Accordingly, departures can be made from the foregoing concepts and embodiments without departing from the scope afforded by the following claims, which scope is only limited by the claims when appropriately construed.

What is claimed is:

1. A non-transitory machine-readable storage medium having stored thereon a computer program comprising a set of instructions that, upon execution by one or more processors of a mobile device, cause the mobile device to perform one or more steps, comprising:
   providing a notification to a fan through a touchscreen display interface of the mobile device that an entity the fan supports is ready to perform or an event the fan supports is ready to occur;
   logging an interaction of the fan with a logger of the mobile device regarding the entity ready to perform or the event ready to occur;
   providing sensor data over a network interface to one or more servers for combination with a combined amount of calculated sensor data for up to all fans of the entity ready to perform or the event ready to occur,
   wherein the sensor data is provided to the one or more servers;
   providing an interactive visual element on a touchscreen display of the mobile device with a fan-interaction module of the mobile device,
   wherein the interactive visual element includes a rally item selected from a rally stick, a rally towel, and a rally clapper; wherein data generated by geolocated fans is stored and uploaded to a geolocation map and made available through an application programming interface; and
   logging the interaction of the fan with the logger of the mobile device by logging sensor data generated by an accelerometer of the mobile device, a gyroscope of the mobile device, or a combination thereof when the fan waves the mobile device.

2. The machine-readable storage medium of claim 1, further comprising:
   logging the interaction of the fan with the mobile device by logging sensor data generated by an accelerometer of the mobile device, a gyroscope of the mobile device, or a combination thereof when the fan swings the mobile device and the interactive visual element is the rally towel.

3. The machine-readable storage medium of claim 1, further comprising:
   logging the interaction of the fan with the mobile device by logging sensor data generated by a touchscreen sensor of the mobile device when the fan taps the touchscreen display of the mobile device and the interactive visual element is the rally clapper.

4. The machine-readable storage medium of claim 1, further comprising:
   enabling a sponsor with a sponsor module of the mobile device to brand the rally item with one or more brands of the sponsor,
      sponsor the entity ready to perform or the event ready to occur, and hold contests among up to all the fans of the entity ready to perform or the event ready to occur.

* * * * *